United States Patent [19]

Mabrey et al.

[11] 4,446,300

[45] May 1, 1984

[54] ISOCYANURATE-TYPE POLYMERS

[75] Inventors: David W. Mabrey; Daniel J. Lange; Daniel J. Lee, all of St. Louis, Mo.

[73] Assignee: The P. D. George Company, St. Louis, Mo.

[21] Appl. No.: 507,867

[22] Filed: Jun. 27, 1983

[51] Int. Cl.³ .................. C08G 63/44; C08G 69/44
[52] U.S. Cl. .................. 528/288; 528/296; 528/371
[58] Field of Search ............... 528/288, 296, 371

[56] References Cited

U.S. PATENT DOCUMENTS

| | | | |
|---|---|---|---|
| 1,800,296 | 4/1931 | Hönel | 524/277 |
| 2,936,296 | 5/1960 | Precopio et al. | 524/352 |
| 2,982,754 | 5/1961 | Sheffer | 524/352 |
| 3,201,276 | 8/1965 | Meyer et al. | 528/288 X |
| 3,211,585 | 10/1965 | Meyer et al. | 428/389 |
| 3,249,578 | 5/1966 | Meyer et al. | 524/352 |
| 3,342,780 | 9/1967 | Meyer et al. | 528/279 |
| 3,415,903 | 12/1968 | Bottger | 528/288 X |
| 3,426,098 | 2/1969 | Meyer et al. | 428/379 |
| 3,555,113 | 1/1971 | Sattler | 525/429 |
| 3,931,418 | 1/1976 | Risken | 528/288 X |
| 4,066,593 | 1/1978 | Czajka et al. | 528/288 X |
| 4,307,226 | 12/1981 | Bolon et al. | 528/288 |
| 4,390,686 | 6/1983 | Janssen et al. | 528/288 X |

*Primary Examiner*—Lucille M. Phynes
*Attorney, Agent, or Firm*—Sidney B. Ring; Roger P. Glass

[57] ABSTRACT

This invention relates to polymers prepared by reacting cyanuric acid and ethylene carbonate in situ to form the corresponding Tris(2-hydroxyethyl)isocyanurate-containing polymers including polyesters, polyester-imides, polyester-amide-imides, oil-modified derivatives thereof, etc. This invention also relates to such products employed as electrical insulation.

32 Claims, No Drawings

ISOCYANURATE-TYPE POLYMERS

Heretofore a wide variety of polymers have been prepared which contain Tris(2-hydroxyethyl)isocyanurate (THEIC) including polyesters, polyester-imides, polyester-amide-imides, etc.; varnishes derived from such polymers and such products employed as electrical insulation.

These are illustrated in the following patents:
U.S. Pat. Nos. 3,426,098, 3,249,578, 3,211,585, 3,342,780, 3,555,113, etc.

It is known that THEIC can be prepared by reacting cyanuric acid (CA) with ethylene carbonate (EC) in the presence of a catalyst such as potassium carbonate or tetraethyl ammonium bromide, [N(CH$_3$)$_4$Br].

We have now discovered that CA & EC can be employed in preparing such polymers where CA and EC react in situ with the other reactants, even without the catalysts of the prior art, to form corresponding THEIC-containing polymers. This is surprising in view of the fact that there are other functional groups present in the reaction mixture which are known to react with ethylene carbonate such as glycols, polyols, carboxylic groups, etc. and that the CH$_2$CH$_2$—OH groups of THEIC are known to react to form more than one CH$_2$CH$_2$—OH group such as —CH$_2$CH$_2$O(CH$_2$CH$_2$—O)$_n$H, where n is 1 or more.

Thus, polymers heretofore prepared from THEIC can now be prepared by employing cyanuric acid (CA) and ethylene carbonate (EC) in place of THEIC in conjunction with the other reactants. For example, where THEIC has heretofore been employed in preparing the polymers, cyanuric acid plus at least a stoichiometric amount of ethylene carbonate (i.e., at least 3 moles of ethylene carbonate per mole of cyanuric acid) can be employed. By employing CA and EC in place of THEIC one obtains the corresponding THEIC Polymer.

Products prepared by the CA/EC process of this invention not only are more economical than those prepared from THEIC and have improved properties, but they also differ structurally from those products prepared from THEIC.

The preferred esters of this invention are prepared from phthalic acids such as orthophthalic, isophthalic acids or terephthalic acids, and CA/EC, with or without ethylene glycol.

The preferred polyester-imides are prepared from an aromatic diamine such as

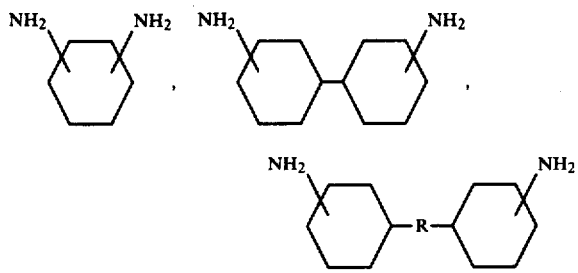

where R is a bridging group such as O, alkylene such as CH$_2$, etc.

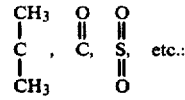

and trimellitic anhydride, pyromellitic dianhydride, BTDA (benzophenone tetra carboxylic dianhydride) or any carboxylic acid anhydride, phthalic acids, such as orthophthalic acid, isophthalic acid or terephthalic acid, and CA/EC, with or without ethylene glycol.

Other diamines which are suitable for use in the present invention are: 4,4'-diamine-diphenyl propane; 4,4'-diamino-diphenyl methane; benzidine; 3,3'-dichlorobenzidine; 4,4'-diaminodiphenyl sulfide; 3,3'-diaminodiphenyl sulfone; 4,4'-diamino-diphenyl sulfone; 4,4'-diaminodiphenyl ether; 1,5-diamino-naphthalene; meta-phenylenediamine; para-phenylene-diamine; 3,3'-dimethyl-4,4'-biphenyl diamine; 3,3'-dimethoxy benzidine; bis-(beta-amino-t-butyl)toluene; bis(para-beta-amino-t-butyl-phenyl)ether; bis(para-beta-methyl-delta-amino-pentyl)benzene; bis-para(1,1-dimethyl-5-amino-pentyl)benzene; 1-isopropyl-2,4-metaphenylene diamine; m-xylylene diamine; p-xylylene diamine, etc.

In addition to the aromatic polycarboxylic acids or esters, and CA/EC, one may employ flexibility modifiers such as aliphatic dicarboxylic acids, glycols, polyols, glycolethers, etc.

Suitable modifiers include aliphatic dicarboxylic acid such as maleic, adipic, sebacic, azelaic, acids, etc., glycols such as ethylene glycol, neopentyl glycol, 1,4-butanediol, 1,3-butanediol, diethylene glycol, dipropylene glycol, hexamethylene glycols, 1,5-pentane diol, 1,4-cyclohexanedimethanol, etc. and polyols such as glycerol, trimethylolethane, trimethylol propane, pentaerythritol, sorbitol, mannitol, etc.

POLYESTERS

The polyester is made by reacting CA/EC with terephthalic acid and/or isophthalic acid or an ester derivative of such acids.

The CA/EC can be employed as the sole polyhydric alcohol or it can be replaced in part by one or more other polyhydric alcohols. While as little as 10% of the total polyhydric alcohol can be CA/EC, preferably at least 50% of the total polyhydric alcohol is CA/EC on a weight basis.

On an equivalent percent basis preferably at least 25% of the total polyhydric alcohol is CA/EC moiety.

In making the polyester usually 15 to 46 equivalent percent is the carboxylic acid reactant and the balance is the polyhydric alcohol, i.e., there should be an excess of alcoholic groups over acid groups.

All of the polycarboxylic acid constituent can be the terephthalic acid and/or isophthalic acid or a portion up to 80 equivalent percent of the acid constituent can be a different acid. Preferably at least 50 equivalent percent of the acid component is terephthalic acid. The term equivalent percent is conventionally employed in the art since the alcohol and acid components react on an equivalent rather than a molar basis. The term "equivalent" is well known and defined for example in Precopio U.S. Pat. No. 2,936,296.

When a modifying polyhydric alcohol is employed, it can be ethylene glycol; glycerine; pentaerythritol; 1,1,1-trimethylolethane; 1,1,1-trimethylolpropane; sorbitol; mannitol; dipentaerythritol; aliphatic hydrocarbon diols, e.g., butanediol 1,4; pentandiol 1,5; butene 2-diol 1,4; butanediol 1,3; butyne-2-diol 1,4; butanediol 1,2; hexanediol 1,3; hexanediol 1,2; and cyclic glycols, e.g., 2,2,4,4-tetramethyl-1,3-cyclobutanediol; diethylene glycol, dipropylene glycol; hydroquinone di beta hydroxyethyl ether and 1,4-cyclohexanedimethanol.

As the acid reactant there is employed terephthalic acid and/or isophthalic acid or acyl halides thereof, e.g., methyl, ethyl, propyl, butyl, amyl, hexyl and octyl terephthalates and the corresponding isophthalates as well as the half esters, e.g., monomethyl terephthalate as well as mixtures of such esters and acids or acid halides.

Since alcoholysis reactions are rather slow when run without catalysts, we prefer to use alcoholysis catalysts when preparing the polyester resins of the present invention. Among the many alcoholysis catalysts which may be used are included for example, dibutyltin oxide, lead oxides, lead acetate, zinc oxide, cadmium acetate, cuprous acetate, zinc acetate, magnesium acetate, beryllium acetate, stannic acetate, ferric acetate, nickel acetate, etc. The amount of catalyst employed is not critical and may vary over a wide range depending on the particular polyester system under consideration. In general, we employ from about 0.01 to about 5 percent, by weight, of the alcoholysis catalyst, based on the total weight of polyester resin. Higher concentrations of such catalyst may be employed but no advantage is gained by such use. Preferably we employ about 0.1 percent, by weight, of the metallic component of catalyst based on the total weight of the resin employed.

When a modifying polycarboxylic acid is employed it can be either aliphatic or aromatic. Typical examples are adipic acid, orthophthalic anhydride, hemimellitic acid, trimesic acid, trimellitic anhydride, succinic acid, tetrachlorophthalic anhydride, hexachloroendomethylene tetrahydrophthalic acid, endomethylene tetrahydrophthalic acid, maleic acid, sebacic acid, etc.

To improve abrasion properties of the wire enamel small amounts of metal driers are employed.

The total number of hydroxyl groups on the alcohols normally is 1 to 1.6 times the total number of carboxyl groups on the acids.

The properties of the polyester can be improved by the addition of a polyisocyanate in an amount of 0.1%, 10% or even 40% by weight of the total of polyisocyanate and polyester. Preferably the polyisocyanate is 0.1-15% by weight of the total solids in the wire enamel.

Preferably, the polyisocyanate has at least three available isocyanate groups.

Among the polyisocyanates which can be employed there may be mentioned diisocyanates such as
2,4-tolylene diisocyanate,
2,6-tolylene diisocyanates,
cyclopentylene diisocyanate,
m-Phenylene diisocyanate,
p-Phenylene diisocyanate,
Ethylene diisocyanate,
Butylidene diisocyanate,
1,5-naphthalene diisocyanate,
1,6-hexamethylene diisocyanate,
Dianisidine diisocyanate,
4,4'-diphenyl ether diisocyanate,
4,4'-diphenyl methane diisocyanate,
4,4,4''-triphenyl methane triisocyanate (Desmodur R), the cyclic trimer of 2,4-tolylene diisocyanate, the cyclic trimer of 2,6-tolylene diisocyanate, mixtures of the cyclic trimers of 2,4-tolylene diisocyanate and 2,6-tolylene diisocyanate, the trimer of 4,4'-diphenyl methane diisocyanate, trifunctional isocyanate trimers having the formula:

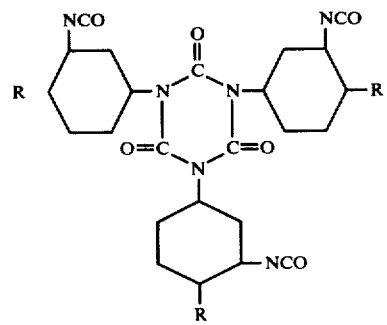

where
R is a lower alkyl radical, e.g.,
n-butyl,
tertiary butyl,
secondary butyl,
isopropyl,
methyl,
ethyl, etc.
1,3,5-triisocyanate benzene,
2,4,6-triisocyanate toluene,
4,4'-dimethyl-diphenylmethane,
2,2',5,5'-tetraisocyanate,
2,4,4'-triisocyanate diphenylmethane,
2,4,6-triisocyanato diphenyl ether,
2,2',4-triisocyanate diphenyl ether,
2,2',4-triisocyanate diphenyl sulfide,
2,4,4'-triisocyanato diphenyl sulfide,
2,3',4-triisocyanato-4'methyl diphenyl ether,
2,3'4-triisocyanato-4'-methoxydiphenyl ether,
2,4,4'-triisocyanato-3'-chlorodiphenyl ether,
4,4',6-diphenyl triisocyanate,
1,2,4-butanetriol triisocyanate,
1,3,3-pentane triisocyanate,
1,2,2-butane triisocyanate,
phloroglucinol triisocyanate,
the reaction product of 3 mols of 2,6-tolylene diisocyanate with 1 mol of trimethylol propane, the reaction product of 3 mols of 2,6-tolylene diisocyanate with 1 mol of trimethylol propane, the reaction product of 3 mols of 2,4-tolylene diisocyanate with 1 mol of trimethylol ethane, the reaction product of 3 mols of 2,4-tolylene diisocyanate with 1 mol of trimethylol ethane and, in general, the reaction product of a diisocyanate with sufficient polyhydric alcohol to react with half the isocyanate groups.

While the polyisocyanates can be used as such, particularly where pot life is important, it is preferred to block the isocyanate groupings with a group that will split off at the reaction temperature employed with the polymeric terephthalic and/or isophthalic ester. Typical compounds which can be used to block the isocyanate groupings, e.g., by forming carbamates therewith, are monohydric phenols, such as phenol, meta-cresol, paracresol, orthocresol and mixtures thereof, the xylenols, e.g., 2,6-dimethyl phenol, 4-ethyl phenol, 4-tertiary butyl phenol, 2-butyl phenol, 4-n-octyl phenol, 4-isooctyl phenol, 2-chloro phenol, 2,6-dichloro phenol, 2-nitro phenol, 4-nitro phenol, 3-nitro phenol, monohydric alcohols such as methyl alcohol, ethyl alcohol, n-propyl alcohol, isopropyl alcohol, tertiary butyl alcohol, tertiary amyl alcohol, octyl alcohol, stearyl alcohol, acetoacetic ester, hydroxyalkylcarbamic acid aryl esters, e.g., hydroxyethylcarbamic acid phenyl ester, hydroxyethylcarbamic acid cresyl ester, diethyl malonate, mercaptans, e.g., 2-mercaptobenzothiazole, 2-mercaptothiazoline,
dodecyl mercaptan,
ethyl 2-mercaptothiazole,
p-naphthyl mercaptan,
methyl mercaptan,
butyl mercaptan,
lactams, e.g., ε-caprolactam, Δ-valerolactam, γ-butyrolactam, β-propiolactam, imides, e.g., succinimide, phthalimide, naphthalimide, glutarimide, dimethylphenyl carbinol, secondary amines, e.g., o-ditolyamine, m-ditolyamine, p-ditolyamine, N-phenyl toluidine, phenyl-α-naphthylamine, carbazole, diphenylamine, etc., mono-α-phenylethyl, di-α-phenylethyl phenol, tri-α-phenylethyl phenol, carvacrol, thymol, methyl diphenyl carbinol, triphenyl carbinol, 1-nitro tertiary butyl carbinol, 1-chloro-tertiary butyl carbinol, triphenyl sianol, 2,2'-dinitrodiphenylamine, 2,2'-dichloro diphenylamine, ethyl n-butyl maionate, ethyl benzyl malonate, acetyl acetone, acetonyl acetone, benzimidazole, 1-phenyl-3-methyl-5-pyrazolone.

As specific examples of such blocked polyisocyanates, there may be mentioned Mondur S, wherein the isocyanate groups of the reaction product of 3 moles of mixed 2,4, and 2,6-tolylene diisocyanate with trimethylpropane are blocked by esterification with phenol and Mondur SH, wherein the mixed cyclic trimers of 2,4 and 2,6-tolylene diisocyanates have the three free isocyanate groups blocked by esterification with m-cresol. At present Mondur SH is the preferred polyisocyanate.

Other blocked polyisocyanates include the cyclic trimer of 2,4-tolylene diisocyanate having the isocyanate groups blocked with tertiary butyl alcohol or tertiary amyl alcohol or dimethyl ethyl carbinol or acetoacetic acid ester or phenol or cresylic acid or ε-caprolactam or 2-mercaptobenzothiazole or succinimide or phthalimide or diphenyl amine or phenyl-α-naphthyl amine, triphenyl methane triisocyanate having the isocyanate groups blocked with phenol or mixed cresols or tertiary butyl alcohol or phthalimide, 1,3,3-pentanetriisocyanate having the isocyanate groups blocked with m-cresol, etc.

Unless otherwise stated hereinafter in the specification and claims, it is understood that whenever the term "polyisocyanate" is employed, it is intended to include both the free isocyanates and the blocked isocyanates.

The polyisocyanate is mixed with the preformed polyester either dry or dissolved in a solvent prior to mixing. The reaction between the polyester and the polyisocyanate is hastened by using elevated temperatures and in preparing wire enamels they are usually reacted at a temperature of about 650° to 800° F.

The metal drier is preferably used in an amount of 0.2 to 1.0% metal based on the total solids in the enamel. Typical metal driers include the zinc, lead, calcium, cadmium or cobalt linoleates, octoates, and resinates of each of these metals, e.g., Zinc resinate, cadmium resinate, lead linoleate, calcium linoleate, zinc naphthenate, lead naphthenate, calcium naphthenate, cadmium naphthenate, zinc octoate, and cadmium octoate. Other suitable metal driers, specifically polyvalent metal driers such as manganese naphthenate and cobalt naphthenate can be employed.

It has further been found that the properties of the polyester wire enamel can be improved by incorporating a tetrahydrocarbon titanate. Typical titanates include tetraalkyl titanates such as tetraisopropyl titanate, tetrapropyl titanate, tetrabutyl titanate, tetraamyl titanate, tetrahexyl titanate, tetraethyl titanate, tetramethyl titanate and diisopropyl dibutyl titanate as well as carbocyclic aryl titanates such as tetraphenyl titanate, tetra cresyl titanate (made from any of the cresol isomers alone or in admixture with each other), tetraxylenyl titanate and t-butyl titanate polymer.

The titanate is used in small amounts, e.g., 0.001 to 10%, preferably 1–8% based on the total solids in the wire enamel.

As the phenol-formaldehyde resin there can be used phenols, such as phenol per se, o-cresol, m-cresol, p-cresol, mixed cresols, e.g., cresylic acid and meta para-cresol, xylenol, diphenylol propane, p-butylphenol, p-tert, amyl phenol, p-octyl phenol p,p'-dihydroxydiphenyl ether. Obviously mixtures of phenols can be used as indicated above. There can be used 0.5 to 1.5 moles of formaldehyde per mole of phenol. Preferably less than 1 mole of formaldehyde is employed per mole of phenol. Most preferably about 0.8 mole of formaldehyde is used. The preferred phenol is cresol.

The phenol formaldehyde resin is preformed in conventional manner prior to addition to the polyester.

Various titanate esters can be added to the phenolic resin before being added to the polyester.

The solvent employed in making the wire enamel is cresylic acid. Cresylic acid has a boiling range of 185° to 230° C. and is a mixture of o-, m- and p-cresols. The individual cresols, e.g., para cresol, meta cresol or ortho cresol can be employed although it is preferred to use the commercial cresylic acid mixture.

It is frequently desirable to dilute the cresylic acid with an aromatic hydrocarbon, e.g., a heavy coal tar or petroleum naphtha or with xylene, etc. The naphtha can be employed in an amount of from 0 to 60%, e.g., 5 to 60%, based on the total weight of the solvents; preferably, the naphtha should be 20–40%. Various aromatics and aliphatic naphthas, especially high boiling naphthas can be employed such as EW naphtha (an enamel wire heavy coal tar naphtha sold by the Barrett Division of Allied Chemical and Dye Corporation) and Solvesso No. 100, an aromatic naphtha derived from petroleum.

Normally the wire enamel is made up as a 25–50% solids concentration although this can be varied as desired. The preferred solvent is a mixture of 65% cresylic acid and 35% of an aromatic naphtha.

The wire enamel is applied to the wire, e.g., copper or aluminum wire, by either the "free dip" belt or the die application procedure. In the following specific examples in which wire test results are recorded the die application procedure was employed to obtain a build up of approximately 3 mils on No. 18 A.W.G. copper wire. The enamel was baked on the wire at 750° F.

POLYESTERIMIDES

The polyimide can be from 5 to 50% by weight of the total of polyimide and polyester. Preferably the polyimide is 30 to 35% of the total. Good results have also been obtained where the polyimide was 10 to 20% by weight of the total of the polyimide and polyester.

Unless otherwise indicated, all parts and percentages are by weight.

As the polyimide forming components there can be used (a) anhydrides such as trimellitic anhydride, pyromellitic dianhydride, benzophenone 2,3, 2,3'-tetracarboxylic dianhydride, 2,3,6,7-naphthalene dianhydride and 3,3',4,4'-diphenyl tetracarboxylic dianhydride and (b) polyamines, preferably aromatic amines, including methylene dianiline, benzidine, 3,3'diaminodiphenyl, 1,4-diamino naphthalene, p-phenylene diamine, α-ω-nonamethylene diamine, 4,4'-diaminodiphenyl ether, 4,4-dimethylheptamethylene diamine-1,7,diaminodiphenyl ketone, bis-(4-aminophenyl)-α,α'-p-xylene, p-phenylene diamine, m-phenylene diamine, xylene diamine, hexamethylene diamine, ethylene diamine, 4,4'-dicyclohexylmethane diamine, diaminodiphenyl sulfone. The preferred diamines are first methylene dianiline and second oxydianiline. Reactants (a) and (b) are usually employed in an amount of approximately 2 moles of (a) per mole of (b) to form the imide-acid. Generally 1.92 to 2.08 moles of the anhydride are used per mole of diamine although the anhydride can be used in excess. The reaction product of two moles of trimellitic anhydride and 1 mole of oxydianiline or methylene dianiline has the formula reaction of trimellitic anhydride (or other anhydride) with the methylene dianiline (or other diamine).

It should be realized of course, that any free acid or anhydride groups on the polyimide will also take part in the ester forming reaction.

The terephthalic acid, isophthalic acid and benzophenone dicarboxylic acid can also be used in admixture with each other.

The terephthalic acid, isophthalic acid or benzophenone dicarboxylic acid is usually reacted in the form of the dimethyl ester, e.g., as dimethyl terephthalate, 4,4'-dimethyl benzophenone dicarboxylate or dimethyl isophthalate, although the free acids can be used, or an acyl halide thereof, e.g., terephthaloyl chloride, or other alkyl esters, e.g., the ethyl or butyl esters or half esters, e.g., monomethyl terephthalate.

In making the polyester-imide there is preferably an excess of alcoholic groups. Normally the number of hydroxyl groups on the alcohol component is 1 to 1.6 times the total number of carboxyl groups on the acid components.

The polyester-imide wire enamel is usually modified by incorporation of 1 to 25% of a polyisocyanate based on the weight of the total of the polyisocyanate and polyester and/or by the incorporation of 0.01 to 10% of

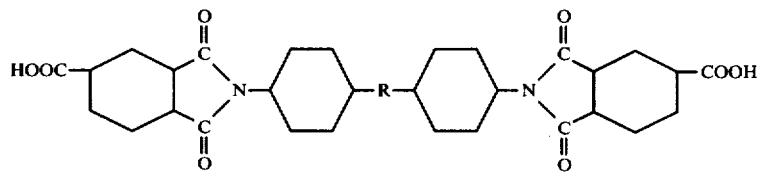

where R is O in the case of oxydianiline or CH₂ in the case of methylenedianiline, etc.

The polyester forming ingredients include CA/EC and terephthalic acid, isophthalic acid and/or benzophenone dicarboxylic acid as the acid.

A portion of the CA/EC up to 80 equivalent percent of the total polyhydric alcohol can be replaced by another polyhydric alcohol such as ethylene glycol, glycerine, pentaerythritol, 1,1,1-trimethylolethane, 1,1,1-trimethylolpropane, sorbitol, mannitol, dipentaerythritol, butanediol-1,4, trimethylene glycol, propylene glycol, pentanediol-1,5-neopentylene glycol, butene-2-diol-1,4, butyne-2-diol=1,4,2,2,4,4-tetramethyl-1,3-cyclobutanediol, hydroquinone dibeta hydroxyethyl ether and 1,4-cyclohexane dimethanol. Preferably at least 50 equivalent percent of the total polyhydric alcohol is the THEIC.

When a modifying alcohol is employed, preferably it is a dihydric alcohol. Preferably the only alcohol present containing at least three hydroxyl groups is the tris(2-hydroxyethyl) isocyanurate formed from CA and EC.

A portion of the terephthalic acid, isophthalic acid and/or benzophenone dicarboxylic acid up to 50 equivalent percent of the total acid can be replaced by another polycarboxylic acid, e.g., adipic acid, ortho phthalic anhydride, hemellitic acid, trimesic acid, trimellitic acid, succinic acid, tetrachlorophthalic anhydride, hexachloroendomethylene tetrahydrophthalic acid, endomethylene tetrahydrophthalic acid, maleic acid, maleic anhydride, sebacic acid. If the modifying acid has only two carboxyl groups and these are situated in imide forming position then the modifying acid is preferably added to the reaction mixture after the an alkyl titanate based on the total solids of the enamel.

As the polyisocyanate there can be used 2,4-tolylene diisocyanate, 2,6-tolylene diisocyanate, m-phenylene diisocyanate, 1,6-hexamethylene diisocyanate, the cyclic trimer of 2,6-tolylene diisocyanate, the trimer of 4,4'-diphenyl methane diisocyanate, 1,3,5-triisocyanato benzene, blocked isocyanates such as the reaction product of 3 mols of mixed 2,4- and 2,6-tolylene diisocyanate with trimethylol propane wherein the isocyanate groups are blocked by esterification with phenol (Mondur S), and Mondur SH wherein the mixed cyclic trimers of 2,4- and 2,6-tolylene diisocyanates have the three free isocyanate groups blocked by esterification with m-cresol. Other examples of suitable polyisocyanates, including blocked isocyanates are given in Sheffer et al. U.S. Pat. No. 2,982,754 in column 1, line 41 to column 3, line 7.

Typical examples of suitable alkyl titanates include tetraisopropyl titanate, tetramethyl titanate, tetrabutyl titanate, tertrahexyl titanate and tetrapropyl titanate.

The polyester-polyimide forming reaction is normally carried out in the presence of the same solvents used to form the wire enamel. Thus, there can be used N-methyl pyrrolidone, dimethyl acetamide, dimethyl formamide, dimethyl sulfoxide, N-methyl caprolactam, xylene, cresylic acid, p-cresol, m-p-cresol mixture, dimethyl sulfone or the like. Mixtures of solvents can be used, e.g., blends of N-methyl pyrrolidone with dimethyl acetamide and/or dimethyl formamide, a mixture of N-methyl pyrrolidone, dimethyl acetamide and toluene (6:3:4), N-methyl pyrrolidone and xylene.

Both aliphatic and aromatic hydrocarbons can be used as diluents, e.g., aromatic naphthas such as Solvesso No. 100, toluene, xylene, octane, decane, dodecane and tetradecane. The addition of the higher boiling aliphatic hydrocarbons as part of the solvent improve the smoothness of the wire enamel.

Sometimes a metal drier is added in an amount of 0.2 to 1.0% metal based on the total solids in the enamel. Typical metal driers include zinc octoate, cadmium linoleate, zinc resinate, calcium octoate, cadmium naphthenate, zinc naphthenate and cobalt naphthenate.

There is preferably included in the wire enamel 1 to 5% based on the total solids of a melamine-formaldehyde resin or a phenolic resin such as phenol-formaldehyde, cresol-formaldehyde or xylenol-formaldehyde. The use of the phenolic resin is preferred over the melamine resin.

The polyester-polyimide is employed as a wire enamel while in solution in a solvent system such as those specified above. It is applied to an electrical conductor, e.g., copper, aluminum, silver or stainless steel wire in conventional fashion. Thus, wire speeds of 15 to 32 feet/min. or more can be used with wire tower temperatures of 250° to 800° F., usually with a final temperature of above 500° F. The build up of enamel on the wire can be 0.0005 to 0.004 inch and in normal practice is about 0.003 inch (3 mils).

OIL MODIFIED RESINS

The present invention also relates to oil-modified resins derived from CA/EC resins, including polyesters, polyesterimides, polyesteramide-imides, etc., which are prepared with fatty acids and/or oils, for example of long, medium or short oil content; to uses therefor, including electrical conductors coated therewith; and more particularly to the use of said oil-modified polyesters as electrical insulating varnishes.

We have particularly found that said oil or fatty acid modified polyesters, particularly those containing certain resins, for example oil-soluble phenol-aldehyde resins, can be made into outstanding electrical insulating varnishes. In the preferred embodiments we have found that certain oil or fatty acid modified polyesters prepared from a polycarboxylic acid and CA/EC in-situ which also contain a glycol and/or polyol, and more particularly those which also contain oil soluble resins, such as phenol-aldehyde resins, can be used to prepare outstanding electrical insulating varnishes.

In general, the compositions of the present invention are prepared by employing a fatty acid or oil in conjunction with CA/EC and resins so as to produce the corresponding oil modified resins. The general process for preparing oil modified resins is so well known to the art that we shall not go into such preparation in great detail. Preparation can be effected by alcoholysis or acidolysis.

Representative fatty oils which may be used in the practice of the present invention are included the non-drying, semi-drying, and drying fatty oils, including vegetable oils, animal oils, marine oils and treated marine oils, such as soya, cottonseed, hydrogenated cottonseed, linseed, castor, hydrogenated castor, dehydrated castor, cocoanut, tung, oiticica, menhaden, hempseed, grapeseed, corn, codliver, candelnut, walnut, perilla, poppyseed, safflower, conjugated safflower, sunflower, rapeseed, Chinawood, tristearin, whale, sardine, herring, etc. oils. Instead of using these oils, it should be understood that for the purposes of the present invention fatty acids or mixtures of fatty acids which make up the fatty oils or their equivalents can be employed.

Representative monocarboxylic acids including fatty acids may be illustrated by the following: abietic acid, benzoic acid, caproic acid, caprylic acid, castor fatty acid, coconut fatty acid, cottonseed fatty acid, crotonic acid, DCO FA, i.e. primarily $CH_3(CH_2)_5CH=CH-CH=CH(CH_2)_7COOH$, 2-ethyl hexoic acid, lauric acid, linoleic acid, linolenic acid, linseed FA, oleic acid, pelargonic acid, Rosin acid (AN 165), soya FA, Tall Oil FA (AN 195, AN 192), etc.

Percentage oil length normally refers to the oil portion of the resin expressed as a percentage of the total weight of the finished resin. It is equal to the weight of any fatty acid in the resin taken together with the weight of a polyol needed to completely esterify this fatty acid (minus weight of evolved water of esterification) expressed as a percentage of the total solids content of the finished resin.

Thus, for purposes of this invention an oil modified polyester includes polyesters modified with fatty acids as well as oils. The oil-modified polyesters may be of long, medium or short oil content, but is preferably of long oil content; where a fatty acid is employed, it may also be long, medium or short, i.e. having proportionate ranges of fatty acids calculated as glycerides as compared to the oils. These terms have the following meanings: Short oil 25–45%; medium oil 45–55%; long oil 55–75%, weight of oil based on total weight of the polyester formulation including the oil. Lesser amounts of oil such as 25% or lower or greater amounts of oil, such as 75–80% or greater, may be employed in certain instances.

The oil modified polyester resins of this invention can be further modified by employing various resins in conjunction therewith.

Included among such resins are phenol-aldehyde resins, phenol-sulfur resins, phenol-acetylene resins, including resins produced from phenol and substituted phenols, including difunctional, tri-functional and tetrafunctional phenols, naphthols, bisphenols, salicylic acid and salicylates, etc., modified phenolic resins, including phenol-terpene resins, phenol-terpene-aldehyde resins, phenol-naphthalene-aldehyde resins, phenol-urea-formaldehyde resins, phenol-aniline-formaldehyde resins, phenol-glycerol resins, etc., non-phenolic resins having the necessary labile or reactive hydrogen including urea and substituted urea-aldehyde resins, sulfonamide-aldehyde resins, melamine-aldehyde resins, polycarboxy-polyamine resins, resins derived by ring hyrogenation of phenolic resins, and the like.

The compositions of this invention can be employed to prepare insulating varnishes and in particular varnishes yielding electrical conductor coatings having improved properties. These varnishes are particularly valuable for impregnating armature and field coils of motors and for both power and distribution transformers of either the oil or dry type where long life at high operating temperatures is required. These varnishes provide maximum penetration in the tightest wound coils. They are particularly suitable for impregnating motor stators, rotors, and other electrical equipment.

In preparing the insulating varnishes of the present invention, in addition to the oil modified polyester resins there is normally used an oil-soluble phenol-aldehyde resin. The phenol-aldehyde resin gives the varnish heat reactivity, improves electrical properties, aids in the cure and lends hardness and abrasion resistance to the product. Among the oil-soluble phenol-aldehyde resins which can be used are p-tertiary octylphenol-formaldehyde, p-phenylphenol-formaldehyde, 2,2-bis(p-hydroxyphenyl) propane-formaldehyde, o-tertiary butylphenol-formaldehyde, p-tertiary-butyl phenol-formaldehyde and p-t-amyl phenol-formaldehyde. Other suitable phenol-formaldehyde resins are shown in Honel U.S. Pat. No. 1,800,296. Substituted phenols alone or in conjunction with unsubstituted phenol can be used in forming the oil-soluble phenolic resin. While the phenolic resin can be prepared using an acid catalyst, they are generally prepared using alkaline catalysts as is well known in the art. Thus, the p-tertiary butylphenol-formaldehyde resin employed may be prepared by the alkaline (NaOH) catalyzed reaction of 1 mol of the phenol with 1.5 mols of formaldehyde. A typical example of a mixed phenolic resin which can be used is the alkaline (NaOH) catalyzed reaction product of 0.75 mol of p-tertiary butylphenol and 0.25 mol of bisphenol A with 1.5 mols of formaldehyde. The oil-soluble phenol-formaldehyde resins are of the heat-reactive type. The oil-soluble phenol-formaldehyde resin is usually employed in an amount of 10% to 80% by weight of the total of the oil modified polyester and phenolic resin, such as 15-40%, but preferably 20-30%. Increasing the amount of phenolic resin speeds the cure but also sacrifices ageing characteristics. Hence, the amount of phenolic resin is preferably kept at about 20% by weight. It is also possible to eliminate the phenolic resin from the varnish with resulting loss of the advantages from having the phenolic resin present. It is also possible to replace part of the phenolic resin with other heat-reactive resins, e.g., furane resins, triazine resins, urea-formaldehyde, melamine-formaldehyde and epoxy resins, e.g. bisphenol A-epichlorohydrin resin, although the preferred heat-reactive resins are phenolic resins since they impart the best combination of improved properties, all things considered. Rosin-modified phenolics are also advantageously employed.

In addition to the resin components, the insulating varnish also includes one or more solvents, such as xylene, mineral spirits, isophorone, naphtha, toluene, etc.

The insulating varnishes of the instant invention have properties which warrant their use at Class H temperatures. They can withstand temperatures in excess of 180° C. for the normal life of a motor or transformer in which they are utilized. The cured varnishes are highly resistant to oil, chemicals and moisture.

The varnishes in accelerated ageing tests have retained their toughness, flexibility, excellent bonding strength and high dielectric properties after heat ageing for as long as 20,000 hours at over 200° C., based on extrapolated values. The varnishes can be applied by vacuum impregnation or free dip system. They cure readily under infrared heat or in forced air ovens. Baking is normally done at 300° F. to 400° F., although lower temperatures can be used.

A typical insulating varnish is prepared by formulating the resin of this invention with a phenolic resin, usually in a dilute solution for example from about 25-75% solids, but preferably as a 50% solution. Other conventional additives can be employed, for example a drier or curing agent may be employed, for example manganese, zinc, lead, titanium, cadmium, boron, cobalt, thorfum, etc salts, such as the naphthenates, octoates, tallates, etc., thereof for example in ratios of 1-10 parts or more of drier per 1000 parts by weight of polyester resin.

The following is a typical formulation:

EXAMPLE A 1000 parts by weight CA/EC-containing resin
200 parts by weight phenol-formaldehyde resin
The above is employed as a 50% solution containing the above solids.

The following examples are presented for purposes of illustration and not of limitation.

TABLE I

| ABBREVIATION | INGREDIENT |
|---|---|
| EG | ethylene glycol |
| THEIC | tris(2-hydroxyethyl) isocyanurate |
| EC | ethylene carbonate |
| CA | cyanuric acid |
| IPA | isophthalic acid |
| TPA | terephthalic acid |
| DBTO | dibutyltinoxide |
| DMT | dimethyl terephthalate |

CONVENTIONAL THEIC POLYESTERS

The following example is an illustration of the preparation of conventional THEIC polyester coating compositions and the properties of wires insulated with such composition.

EXAMPLE 1

| INGREDIENTS | GRAMS | MOLES | EQUIVALENTS | EQUIVALENT % |
|---|---|---|---|---|
| EG | 202.441 | 3.265 | 6.530 | 37.716 |
| THEIC | 379.432 | 1.454 | 4.361 | 25.188 |
| TPA | 532.825 | 3.208 | 6.419 | 37.075 |
| DBTO | .925 | .00372 | .00372 | .0215 |

The ingredients are charged to a 5-liter, 3-neck flask equipped with a motor driven stirrer, carbon dioxide sparge tube, thermometer and condenser.

The ingredients are heated to 420° F.±10° F. with stirring and carbon dioxide sparging and the temperature is increased to 460° F. after solution becomes clear. At 460° F. the resinous mixture becomes viscous and thread forming, 422.697 g of cresylic acid and 363.211 g of an aromatic hydrocarbon with a boiling range of 310° F. to 340° F. (Solvesso 100) are added.

The solution is diluted to coating viscosity with phenol along with 106.657 g of Mondur SH solution and 205.217 g of a phenol-formaldehyde resin solution.*

*Note 1 A 45% solution of meta, para cresol-formaldehyde resin in aromatic, cresylic acid solvent.

It is then coated on #18 A.W.G. (0.040") copper wire to a build of 2.8-3.2 mils with six passes through a 20 ft. vertical tower at a hot spot temperature of 430° C. The properties are listed in Table II.

CA/EC POLYESTERS (IN SITU PROCESS)

The following examples are illustrative of the preparation of polymeric esters of this invention and the properties of wire insulated with such compositions.

EXAMPLE 2

| INGREDIENTS | GRAMS | MOLES | EQUIVALENTS | EQUIVALENT % |
|---|---|---|---|---|
| EG | 242.93 | 3.918 | 7.836 | 24.423 |
| EC | 497.78 | 5.656 | 11.313 | 35.260 |
| CA | 224.52 | 1.740 | 5.221 | 16.273 |
| DMT | 747.595 | 3.853 | 7.707 | 24.021 |

-continued

| INGRE-DIENTS | GRAMS | MOLES | EQUIVALENTS | EQUIVA-LENT % |
|---|---|---|---|---|
| DBTO | 1.85 | .00743 | .00743 | .0232 |

The ingredients are charged to a 3-liter 3-neck flask equipped with a stirrer, $CO_2$ sparge tube thermometer and condenser. The charge is heated to 410° F. to 430° F. and held until the thread forming stage is reached. Then 507.238 g of cresylic acid, a 434.774 g of an aromatic hydrocarbon with a boiling range of 310° F.–330° F. and 507.238 g of phenol are added with stirring. The cooled solution is modified by adding 127.989 g of Mondur SH solution and 246.261 g of a phenol-formaldehyde resin. (Note 1)

It is coated on #18 A.W.G. copper wire at 35 ft./min. in a 20 ft. vertical-enamelling tower at a hot spot temperature of 430° C. with six passes to a final build of 2.8–3.2 mils. The properties are listed in Table II.

EXAMPLE 3

| INGRE-DIENTS | GRAMS | MOLES | EQUIVALENTS | EQUIVA-LENT % |
|---|---|---|---|---|
| EG | 242.930 | 3.918 | 7.836 | 24.430 |
| EC | 497.78 | 5.656 | 11.313 | 35.269 |
| CA | 224.52 | 1.740 | 5.221 | 16.277 |
| IPA | 127.939 | .770 | 1.540 | 4.801 |
| TPA | 511.756 | 3.08 | 6.162 | 19.210 |
| DBTO | 1.15 | .00462 | .00462 | .0144 |

The ingredients are charged to a 3-liter, 3-neck flask equipped with stirrer, carbon dioxide sparge tube, thermometer and condenser. The ingredients are heated to 420° F. to 440° F. and held until solution clears, then heated to 460° F.±10° F. until thread-forming occurs. Then add 507.238 g of cresylic acid, 434.774 g of an aromatic hydrocarbon with a boiling range of 310° F.–330° F. (Solvesso 100), 507.238 g of phenol. The cooled solution is modified by adding 127.989 g of Mondur SH solution and 246.261 g of a phenol-formaldehyde resin solution. (Note 1)

The material is coated on #18 A.W.G. (0.040″) copper wire to a build of 2.8–3.2 mils with six passes through a 20 ft. vertical tower at a hot spot temperature of 430° C. The properties are listed in Table II.

EXAMPLE 4

| INGRE-DIENTS | GRAMS | MOLES | EQUIVALENTS | EQUIVA-LENTS % |
|---|---|---|---|---|
| EC | 1187.348 | 13.492 | 26.985 | 67.611 |
| CA | 224.52 | 1.740 | 5.22 | 13.079 |
| TPA | 639.695 | 3.851 | 7.7025 | 19.300 |
| DBTO | 1.15 | .00462 | .00462 | .0116 |

The ingredients are charged to 5-liter, 3-neck flask equipped with a motor driven stirrer, carbon dioxide sparge tube, thermometer and condenser. The ingredients are heated to 420° F.±10° F. with stirring and carbon dioxide sparging and the temperature is increased to 460° F. after solution turns clear. When the resinous mixture becomes viscous and thread forming 711.821 g of cresylic acid, 610.132 g of an aromatic hydrocarbon with a boiling range of 310° F.–330° F. (Solvesso 100) and 711.821 g of phenol are added. After the batch has cooled 179.610 g of Mondur SH solution and 345.585 g of a phenol-formaldehyde resin solution are added. (Note 1)

The solution is coated on #18 A.W.G. (0.040″) copper wire to a build of 2.8–3.2 mils with six passes through a 20 ft. vertical tower at a hot spot temperature of 430° C. The properties are listed in Table II.

EXAMPLE 5

| INGRE-DIENTS | GRAMS | MOLES | EQUIVALENTS | EQUIVA-LENT % |
|---|---|---|---|---|
| EG | 121.465 | 1.959 | 3.918 | 24.430 |
| EC | 248.89 | 2.828 | 5.656 | 35.267 |
| CA | 112.26 | .870 | 2.611 | 16.280 |
| TPA | 319.695 | 1.925 | 3.849 | 24.000 |
| DBTO | .925 | .00372 | .00372 | .0232 |

The ingredients are charged to a 3-liter, 3-neck flask equipped with a stirrer, carbon dioxide sparge tube, thermometer and condenser. The ingredients are heated to 400° F.±10° F. with stirring and carbon dioxide sparging. The temperature is increased to 440° F.±10° F. after solution turns clear. When the resinous mixture becomes viscous and thread forming 214.039 g of cresylic acid, 214.039 g of phenol and 183.462 g of an aromatic hydrocarbon (Solvesso 100) are added.

Additions of 57.60 g of Mondur SH solution and 110.82 g of a phenol-formaldehyde resin are made to the cooled mixture. (Note 1)

The solution is coated on #18 A.W.G. (0.040″) copper wire to a build of 2.8–3.2 mils with six passes through a 20 ft. vertical tower at a hot spot temperature of 430° C. The properties are listed in Table II.

EXAMPLE 6

| INGRE-DIENTS | GRAMS | MOLES | EQUIVALENTS | EQUIVA-LENT % |
|---|---|---|---|---|
| EG | 192.319 | 3.102 | 6.204 | 23.471 |
| EC | 415.776 | 4.725 | 9.449 | 35.747 |
| CA | 187.535 | 1.454 | 4.361 | 16.498 |
| IPA | 106.565 | .642 | 1.283 | 4.854 |
| TPA | 426.260 | 2.566 | 5.132 | 19.415 |
| DBTO | .925 | .00372 | .00372 | .01407 |

The ingredients are charged to a 3-liter, 3-neck flask equipped as in previous examples. The mixture is heated to 320° F.–330° F. and held until carbon dioxide is given off. Then the mixture is heated to 420° F.±10° F. until clear. The heat is then increased to 460° F. until viscous and thread forming occurs. At this point 372.96 g of cresylic acid, 372.96 g of phenol and 319.68 g of an aromatic hydrocarbon of boiling range of 310°–330° F. (Solvesso 100) are added.

To the cool solution 106.657 g of Mondur SH solution and 205.217 g of a phenol-formaldehyde resin solution are added. (Note 1).

The mixture is then coated on wire as in the previous examples.

TABLE II

|  | EXAMPLE 1 | EXAMPLE 2 | EXAMPLE 3 | EXAMPLE 4 | EXAMPLE 5 | EXAMPLE 6 |
|---|---|---|---|---|---|---|
| OVEN SET POINT | 360° C. | 360° C. | 360° C. | 360° C. | 360° C. | 360° C. |
| SPEED (FT/MIN) | 35 | 35 | 35 | 35 | 35 | 35 |

TABLE II-continued

|  | EXAMPLE 1 | EXAMPLE 2 | EXAMPLE 3 | EXAMPLE 4 | EXAMPLE 5 | EXAMPLE 6 |
|---|---|---|---|---|---|---|
| NO. OF PASSES | 6 | 6 | 6 | 6 | 6 | 6 |
| DIE SEQUENCE | .043-3-4-4-5-6 | .043-3-4-4-5-6 | .043-3-4-4-5-6 | .043-3-4-4-5-6 | .043-3-4-4-5-6 | .043-3-4-4-5-6 |
| ANNEALER TEMP. | 427° C. | 427° C. | 427° C. | 427° C. | 427° C. | 427° C. |
| BUILD | .0029 | .0030-.0031 | .0030 | .0028-.0029 | .0028-.0029 | .0028 |
| TEXTURE | Sl. Wave | Sl. Grain | Sl. Wave | Occ. Grain | Sl. Grain | Very Sl. Wave |
| COLOR | Med. Tan | Med. Tan | Med. Tan | Med. Dk. Tan | Med. Tan | Med. Dk. Tan |
| *FLEXIBILITY 1 × D | OK | OK | OK | OK | OK | OK |
| *SNAP ( I T C ) | OK | OK | OK | OK | OK | OK |
| *20% SNAP & OK1X MANDREL | PH1X OK2X | OK1X | PH1X OK2X | OK1X | OK1X |  |
| ADHERANCE | Good | Good | Good | Good | Good | Good |
| *ELONGATION | 37% | 37% | 37% | 36% | 38% | 37% |
| *ELONGATION & MANDREL | PH1X OK2X | PH1X OK2X | PH1X OK2X | PH1X OK2X | OK1X | OK1X |
| SCOTT TWIST | 147 | 154 | 137 | 142 | 134 | 139 |
| REPEATED SCRAPES 700 g | 22-24-26 | 16-20-12 | 27-26-24 |  |  | 16-14-18 |
| UNILATERAL SCRAPES | 1100 | 1000 | 1150 | 1800 | 1050 | 1100 |
|  | 1050 | 1050 | 1250 | 1750 | 1300 | 1050 |
|  | 1100 | 1050 | 1250 | 1900 | 1150 | 1150 |
| *DIELECTRIC BREAKDOWN | 12000 | 12000 | 10500 | 9200 | 10400 | 10500 |
|  | 11500 | 12000 | 11000 | 9800 | 12400 | 11000 |
|  | 11000 | 11500 | 11000 | 9600 | 11200 | 11500 |
| *THEROPLASTIC FLOW 2000 g | 349.0° C. | 354.0° C. | 359.0° C. | 348.8° C. | 360.7° C. | 369.0° C. |
| *HEAT SHOCK ½ HR. @ 180° C. |  |  |  |  |  |  |
| 20% SNAP 3X | Surface Cracks | Failed | Surface Cracks | Failed | Surface Cracks | Surface Cracks |
| *NO SNAP 3X | OK3X | OK3X | OK3X | OK3X | OK3X | OK3X |
| TECHRAND SCRAPE |  |  |  |  |  |  |
| 12 SCRAPES | 3 Faults | 9-4 | 14-4 | 10-12 | 23-4 | 11-4 |
| 14 SCRAPES | 3 Faults | 10-3 | 18-4 | 10-15 | 19-4 | 10-5 |
| 15 SCRAPES | 5 Faults | 7-9 | 17-3 | 9-6 | 20-3 | 11-7 |
| *DISSIPATION FACTOR | .4619 | .1690 | .3396 | .2016 | .2811 | .1417 |

*Tests are ASTM D 1676

The following is a representative example of an IN SITU Insulating Varnish.

EXAMPLE 7

| IDEN- TIFICA- TION | INGREDIENTS | WEIGHT/ GRAMS | MOLES |
|---|---|---|---|
| 1 | ISOPHTHALIC ACID | 237.900 | 1.4322 |
| 2 | CYANURIC ACID | 228.041 | 1.7677 |
| 3 | ETHYLENE CARBONATE | 505.930 | 5.7494 |
| 4 | DIBUTYL TIN OXIDE | .410 | .0016 |
| 5 | TALL OIL FATTY ACID | 619.200 | 2.2114 |
| 6 | ALIPHATIC SOLVENT | 1142.800 | — |
| 7 | AROMATIC SOLVENT | 72.900 | — |
| 8 | PHENOLIC RESIN SOLUTION (NOTE 1) | 444.000 | — |
| 9 | COBALT DRIER | 20.150 | — |
| 10 | A.S.A. (NOTE 2) | 3.600 | — |

NOTE 1 - A 45% solution of meta, para cresol-formaldehyde resin in aromatic, cresylic acid solvent.
NOTE 2 - A.S.A. is an anti-skinning agent, butyraldoxine, which is used to prevent skinning in the package due to oxidation.
Ingredients 1, 2, 3 and 4 are charged to a clean reactor with agitator, carbon dioxide sparge and thermometer.
The ingredients are heated to 350° F. ± 10 until total CO₂ evolution has been completed. Then charge ingredient 5 and heat to 490° F. ± 10 until the desired viscosity is reached. Add ingredients 6, 7, 8, 9 and 10, once viscosity is reached.
Constants are as follows:

| Weight per gallon | 7.68 lbs. |
| Viscosity | 225 cps. |
| NVM (non-volatile materials) | 49.14% |
| Cure | 35 Min. |

The following are representative examples of Test Data of materials containing the Insulating Varnish.
1. Dielectrics a. Conventional material = 4600 volts/mil.
b. IN SITU material = 3520 volts/mil.

2. Bond Strength

|  | CONVENTIONAL MATERIAL | IN SITU MATERIAL |
|---|---|---|
| 25° C. | 23.3 lbs. | 25.5 lbs. |
| 150° C. | 1.1 lbs. | 1.2 lbs. |

The following are representative Examples of Ester Imides.

The following example is an illustration of the preparation of the Conventional ester imide coating compositions and the properties of wire insulated with same.

EXAMPLE 8

| IDEN- TIFICA- TION | INGREDIENTS | WEIGHT/ GRAMS | MOLES |
|---|---|---|---|
| 1 | ETHYLENE GLYCOL | 19.750 | .3185 |
| 2 | THEIC | 76.840 | .2944 |
| 3 | DIMETHYL TEREPHTHALATE | 30.860 | .0199 |
| 4 | METHYLENE DIANILINE | 55.940 | .2825 |
| 5 | TRIMELLITIC ANHYDRIDE | 108.560 | .5648 |
| 6 | T-BUTYL TITANATE | .580 | — |
| 7 | CRESYLIC ACID | 380.800 | — |
| 8 | ETHYLENE GLYCOL PHENYL ETHER | 121.970 | — |
| 9 | AROMATIC SOLVENT (Solvesso 100) | 132.510 | — |

-continued

| | | | |
|---|---|---|---|
| 10 | MONDUR SH (NOTE 3) | 16.070 | — |
| 11 | PHENOLIC RESIN SOLUTION (NOTE 1) | 38.780 | — |
| 12 | T-BUTYL TITANATE | 11.300 | — |
| 13 | COBALT DRIER | 5.130 | — |

Ingredients 1 through 6 are added to a clean reactor equipped with an agitator, carbon dioxide sparge tube, thermometer, packed column, condensor and trap. Heat contents slowly to 420° F. ± 10° F. and hold for desired viscosity. When viscosity is reached load ingredients 7 through 13.

The constants of this material are as follows:

| | |
|---|---|
| Weight per gallon | 9.13 ± .15 lbs. |
| Viscosity | 800 ± 100 cps. |
| NVM | 30 ± 1% |

The following is a representative example of an IN SITU ester imide.

EXAMPLE 9

| IDEN-TIFICA-TION | INGREDIENTS | WEIGHT/GRAMS | MOLES |
|---|---|---|---|
| 1 | ETHYLENE GLYCOL | 91.467 | 1.4753 |
| 2 | CYANURIC ACID | 176.065 | 1.3648 |
| 3 | ETHYLENE CARBONATE | 360.110 | 4.0921 |
| 4 | TEREPHTHALIC ACID | 122.358 | .7366 |
| 5 | METHYLENE DIANILINE | 259.072 | 1.3084 |
| 6 | TRIMELLITIC ANHYDRIDE | 502.768 | 2.6158 |
| 7 | T-BUTYL TITANATE | 2.680 | — |
| 8 | CRESYLIC ACID | 1767.795 | — |
| 9 | ETHYLENE GLYCOL PHENYL ETHER | 564.874 | — |
| 10 | AROMATIC SOLVENT (Solvesso 100) | 613.684 | — |
| 11 | MONDUR SH (NOTE 3) | 74.424 | — |
| 12 | PHENOL RESIN SOLN. (NOTE 1) | 179.600 | — |
| 13 | T-BUTYL TITANATE | 52.333 | — |
| 14 | COBALT DRIER | 23.758 | — |

NOTE 3 - Mondur SH polyisocyanate adduct which is said to be a phenol blocked trimer of toluene diisocyanate. Ingredients 1 through 7 are charged to a clean reactor equipped with an agitator, carbon dioxide sparge tube, thermometer, packed column, condensor and trap. The contents are heated to 410 ± 10° F. and held there for a desired viscosity. When the viscosity is reached ingredients 8 through 14 are added. The result is an ester imide with constants of:

| | |
|---|---|
| Weight per gallon | 9.1 lbs. |
| Viscosity | 1400 cps. |
| NVM | 30.66 |

The following is a variation on the preceding IN SITU formula whereas the preceding formula has 30% imide. This formula has approximately 5% imide, having 20% isophthalic acid.

EXAMPLE 10

Ingredients incorporated into the formula with different modifiers:

| IDEN-TIFICA-TION | INGREDIENTS | WEIGHT/GRAMS | MOLES |
|---|---|---|---|
| 1 | ETHYLENE GLYCOL | 296.672 | 4.7850 |
| 2 | CYANURIC ACID | 272.962 | 2.1150 |
| 3 | ETHYLENE CARBONATE | 605.171 | 6.8770 |
| 4 | TEREPHTHALIC ACID | 592.211 | 3.5654 |
| 5 | ISOPHTHALIC ACID | 148.053 | .8913 |
| 6 | METHYLENE DIANILINE | 39.200 | .1980 |
| 7 | TRIMELLITIC ANHYDRIDE | 77.570 | .4035 |
| 8 | DIBUTYL TIN OXIDE | 1.670 | .0067 |
| 9 | CRESYLIC ACID | 670.612 | — |
| 10 | PHENOLIC SOLVENT | 670.612 | — |
| 11 | AROMATIC SOLVENT (Solvesso 100) | 574.809 | — |
| 12 | MONDUR SH (NOTE 3) | 169.217 | — |
| 13 | PHENOLIC RESIN SOLUTION (NOTE 1) | 325.578 | — |

Ingredients 1 through 8 are loaded into a clean reactor equipped with an agitator, carbon dioxide sparge tube, thermometer, packed column, condensor and trap. The contents are then heated to 450 ± 10° F. and held there until the desired viscosity is reached. Once that is achieved ingredients 9 through 13 are then added. The resultant mixture then has constants of:

| | |
|---|---|
| Weight per gallon | 8.7 lbs. |
| Viscosity | 900 cps. |
| NVM | 40% |

The *In Situ* polymers of this invention have a different chemical structure from corresponding polymers prepared in the conventional manner from THEIC.

For example, the *In Situ* polyesters have a different chemical structure from corresponding polyesters prepared in the conventional manner from THEIC. The *In Situ* polyesters of this invention differ from THEIC polyesters conventionally made from Tris(hydroxyethyl)isocyanurate in the following manner:

(1) Solutions of *In Situ* polyesters are less viscous at higher molecular weights than conventional THEIC polyesters.

(2) The higher molecular weights of *In Situ* polyesters yield a product having improved properties on curing.

(3) Because they are less viscous, the *In Situ* polyesters can be used at higher concentrations at the same viscosities as conventional polyesters.

(4) Because they have higher concentrations at the same viscosities, the *In Situ* polyesters lose less solvent on curing, thus reducing costs.

Thus, as compared to conventional polyesters, the *In Situ* polyesters of the present invention:

(1) Have higher molecular weights;
(2) Have higher concentrations of higher molecular weight polyesters at the same viscosities;
(3) Lose less solvent on curing;
(4) Yield cured polyesters of improved properties; and
(5) Can be made at lower cost.

The viscosity-molecular weight relationship is illustrated in the following Table A.

TABLE A

| Conventional THEIC 90,000 MW | | EC/CA IN SITU 104,000 MW | | Conventional THEIC 40,000 MW | | EC/CA IN SITU 89,000 MW | |
|---|---|---|---|---|---|---|---|
| VISC. | SOLIDS | VISC. | SOLIDS | VISC. | SOLIDS | VISC. | SOLIDS |
| 3925 cps. | 47.46% | 3200 cps. | 46.97% | 3630 cps. | 48.42% | 1950 cps. | 47.00% |
| 2050 cps. | 44.55% | 1850 cps. | 43.94% | 2150 cps. | 45.56% | 1300 cps. | 45.22% |
| 1206 cps. | 41.62% | 1100 cps. | 41.00% | 1200 cps. | 42.77% | 865 cps. | 42.76% |
| 595 cps. | 37.59% | 550 cps. | 37.16% | 560 cps. | 38.51% | 535 cps. | 40.00% |

The solvent employed in the above Table A comprises:
Solvesso 100  30%
Cresylic Acid  35%
Phenol  35%

TABLE A-continued

| Conventional THEIC 90,000 MW | | EC/CA IN SITU 104,000 MW | | Conventional THEIC 40,000 MW | | EC/CA IN SITU 89,000 MW | |
|---|---|---|---|---|---|---|---|
| VISC. | SOLIDS | VISC. | SOLIDS | VISC. | SOLIDS | VISC. | SOLIDS |
| | | | | 100%, by weight | | | |

We claim:

1. In a process of preparing polymers containing tris(2-hydroxyethyl)isocyanurate, the improvement which comprises reacting ethylene carbonate and cyanuric acid in situ, wherein the molar ratio of ethylene carbonate to cyanuric acid is at least about 3 to 1.

2. The process of claim 1 where the polymer is a polyester.

3. The process of claim 2 where the polyester is also derived from aromatic polycarboxylic acids or esters thereof and glycols.

4. The process of claim 3 where the aromatic polycarboxylic acid is iso- or terephthalic acids or esters thereof and the glycol is ethylene glycol.

5. The process of claim 1 where the polymer is a polyesterimide and/or a polyester-amide-imide.

6. The process of claim 5 where the polyester-imide or polyester-amide-imide is also derived from aromatic polycarboxylic acids and esters thereof, glycols, aromatic tri- or tetra-carboxylic acids or anhydrides thereof and aromatic diamines.

7. The process of claim 6 where the aromatic polycarboxylic acid and esters thereof are iso- or terephthalic acids or esters thereof, the glycol is ethylene glycol, the aromatic tricarboxylic acid or anhydride is trimellitic anhydride and the aromatic diamine is of the formula

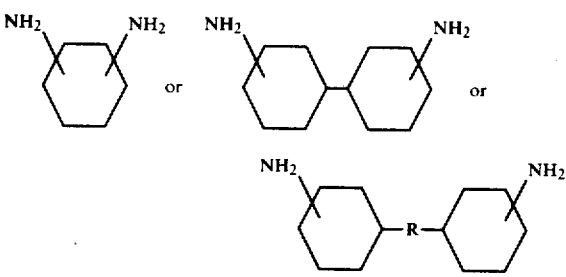

where R is a bridging group.

8. The process of claim 7 where R is O,

$SO_2$ or alkylene.

9. The products of claim 1.
10. The products of claim 2.
11. The products of claim 3.
12. The products of claim 4.
13. The products of claim 5.
14. The products of claim 6.
15. The products of claim 7.
16. The products of claim 8.
17. The cured products of claim 9.
18. The cured products of claim 10.
19. The cured products of claim 11.
20. The cured products of claim 12.
21. The cured products of claim 13.
22. The cured products of claim 14.
23. The cured products of claim 15.
24. The cured products of claim 16.
25. The product of claim 17 employed as an electrical insulator.
26. The product of claim 18 employed as an electrical insulator.
27. The product of claim 19 employed as an electrical insulator.
28. The product of claim 20 employed as an electrical insulator.
29. The product of claim 21 employed as an electrical insulator.
30. The product of claim 22 employed as an electrical insulator.
31. The product of claim 23 employed as an electrical insulator.
32. The product of claim 24 employed as an electrical insulator.

* * * * *